(12) United States Patent
Baciu et al.

(10) Patent No.: US 8,363,807 B2
(45) Date of Patent: Jan. 29, 2013

(54) SYSTEM AND METHOD FOR PERFORMING AN ACTION ON A PHONE IN RESPONSE TO A USER INITIATING AN OUTBOUND CALL TO ONE OR MORE SELECT PHONE NUMBERS

(75) Inventors: Assaf Baciu, Berkeley, CA (US); Sandeep M. Bhojwani, San Jose, CA (US); Jayadev Billa, San Jose, CA (US); Carl Mikael Berner, Sunnyvale, CA (US); Kevin M. Stone, Mountain View, CA (US); David A. Winarsky, Austin, TX (US)

(73) Assignee: Nuance Communications, Inc., Burlington, MA (US)

( * ) Notice: Subject to any disclaimer, the term of this patent is extended or adjusted under 35 U.S.C. 154(b) by 1341 days.

(21) Appl. No.: 11/904,368

(22) Filed: Sep. 27, 2007

(65) Prior Publication Data
US 2009/0046843 A1 Feb. 19, 2009

Related U.S. Application Data

(63) Continuation-in-part of application No. 11/529,078, filed on Sep. 28, 2006, now Pat. No. 7,792,266, and a continuation-in-part of application No. 11/636,172, filed on Dec. 8, 2006.

(51) Int. Cl.
*H04M 3/42* (2006.01)
*H04M 3/00* (2006.01)
*H04W 24/00* (2009.01)

(52) U.S. Cl. ......... 379/201.05; 379/211.02; 379/213.01; 455/414.1; 455/417

(58) Field of Classification Search ............. 379/201.02, 379/201.04, 201.05, 218.01, 211.01, 213.01; 455/414.1, 417, 419, 425
See application file for complete search history.

(56) References Cited

U.S. PATENT DOCUMENTS
4,850,007 A 7/1989 Marino et al.
(Continued)

FOREIGN PATENT DOCUMENTS
EP 1 435 720 A2 7/2004
GB 2 206 265 A 12/1988
(Continued)

OTHER PUBLICATIONS

PCT Search Report and Written Opinion in corresponding PCT Application No. PCT/US2008/011129.

*Primary Examiner* — Ahmad Matar
*Assistant Examiner* — Nafiz E Hoque
(74) *Attorney, Agent, or Firm* — Lessani Law Group, PC

(57) ABSTRACT

The present invention provides a system, method and software application for associating one or more phone numbers with an action on a phone and performing an action on the phone in response to the user initiating a call to one of such phone numbers. Certain phone numbers are associated with an action. The user's phone, or a server with which the user's phone communicates, maintains a table of the phone numbers associated with an action, and each phone number in the table is related to an action. Software on the user's phone listens for call initiated by a user. When the user initiates a call, software on the phone "intercepts" the call, and the phone (or a server with which the phone communicates) determines whether the call is to a phone number that is in the table. If the phone number is in the table, then it is associated with an action, and the user's phone performs that action at a time specified by instructions for such action. The action may be performed before, during, or after the call depending on the instructions associated with the call. Whether a call is placed to the original phone number ultimately depends on the action and the user's response to the action.

23 Claims, 10 Drawing Sheets

A call is initiated
280

Call continues
285

Option for application download is presented after call
290

U.S. PATENT DOCUMENTS

| | | |
|---|---|---|
| 6,856,673 B1 | 2/2005 | Banks et al. |
| 6,907,118 B2 * | 6/2005 | Henderson et al. ...... 379/214.01 |
| 6,917,802 B1 | 7/2005 | Nilsson |
| 7,106,851 B2 * | 9/2006 | Tang et al. ............... 379/355.01 |
| 7,113,571 B2 | 9/2006 | Matsubara et al. |
| 7,120,235 B2 | 10/2006 | Altberg et al. |
| 7,353,016 B2 * | 4/2008 | Roundtree et al. ......... 455/414.1 |
| 7,779,408 B1 * | 8/2010 | Papineau ..................... 717/178 |
| 2001/0048737 A1 | 12/2001 | Goldberg et al. |
| 2004/0091093 A1 | 5/2004 | Bookstaff |
| 2004/0102225 A1 * | 5/2004 | Furuta et al. .................. 455/566 |
| 2004/0207508 A1 | 10/2004 | Lin et al. |
| 2005/0286691 A1 | 12/2005 | Taylor et al. |
| 2006/0098619 A1 | 5/2006 | Nix et al. |
| 2007/0190986 A1 | 8/2007 | Lee |

FOREIGN PATENT DOCUMENTS

| | | |
|---|---|---|
| GB | 2 360 418 A | 9/2001 |
| WO | WO 00/62518 | 10/2000 |

* cited by examiner

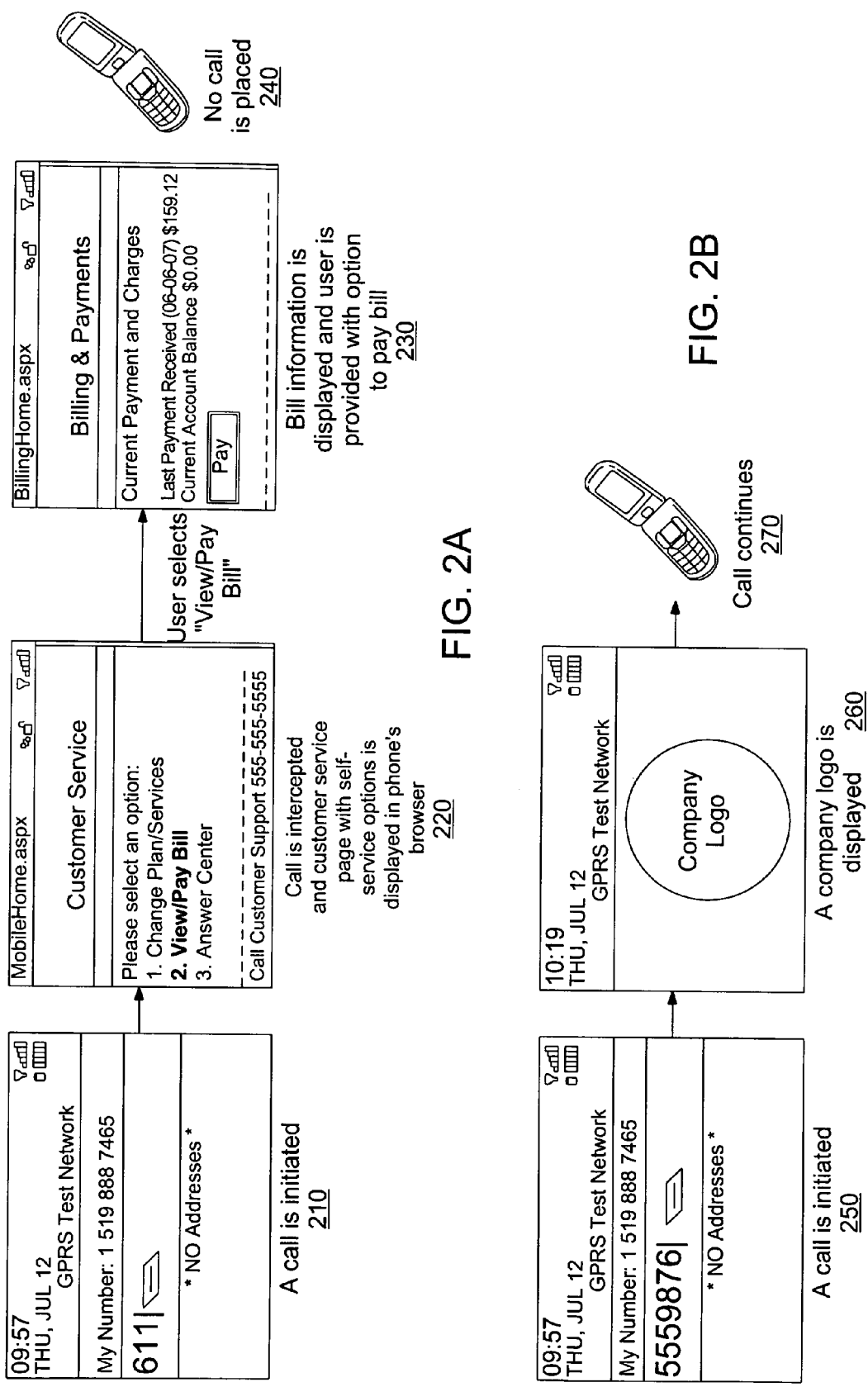

Example Ways to Initiate a Call

Dialing by clicking a link
330

Dialing using a contact/address book
320

Dialing using the keyboard
310

SYSTEM AND METHOD FOR PERFORMING AN ACTION ON A PHONE IN RESPONSE TO A USER INITIATING AN OUTBOUND CALL TO ONE OR MORE SELECT PHONE NUMBERS

RELATED APPLICATIONS

This application is a continuation-in-part of U.S. patent application Ser. No. 11/529,078, titled "Software Program and Method for Reducing Misdirected Calls to a Select Destination" filed on Sep. 28, 2006 now U.S. Pat. No. 7,792,226 and having inventors Sandeep M. Bhojwani and Jayadev Billa, the contents of which are incorporated by reference as if fully disclosed herein.

This application is also a continuation-in-part of U.S. patent application Ser. No. 11/636,172, titled "Software Program and Method for Providing Promotions on a Phone" filed on Dec. 8, 2006 and having inventor Kevin M. Stone, the contents of which are incorporated by reference as if fully disclosed herein.

BACKGROUND OF THE INVENTION

1. Field of the Invention

This invention relates generally to telecommunications and, more specifically, to associating actions on a phone with phone numbers.

2. Description of the Background Art

It is often desirable to perform an automated action in response to a user making a call on a phone, especially when the call is to a business. For instance, when a user dials a phone number for a business, it may be desirable to play a promotion to the user related to the business. Also, when a user dials a customer care center, it is often desirable to provide the user with automated self-service options. In known systems, a user can be played a promotion or provided with self-service options once a user calls into an Interactive Voice Response (IVR) system.

In some cases, using the IVR system to provide such automated information/services has several disadvantages. First, an IVR system provides the user with promotions, self-service options, or other actions only by a voice interface. For some interactions, it is often more effective to provide the user with information via a graphical interface (or via both a graphical and voice interface). Second, when a user is connected to an IVR system, the user is consuming IVR system resources. The more IVR resources consumed, the larger and more costly the IVR system is. Third, the action taken is controlled by the owner or operator of the IVR system. In the case of playing a promotion to a user, this means that the promotions that are played are usually promotions associated or approved by the party that owns or controls the IVR system (e.g., the airline that owns the 1-800 number dialed by the user). In such case, it is not possible for a competitor to pay for a promotion to be played when a user dials a phone number for a competing business.

Therefore, it would be desirable to "intercept" calls to certain numbers before they are placed, and perform certain automated actions on the phone, where examples of such action include providing self-service customer care options, playing a promotion, or providing a user with the option to download a software application. There are software applications for phones that provide user's with technical assistance information (i.e., troubleshooting), but such software application are not triggered upon the user initiating a call. Rather, the user must take the initiative to open and use such applications.

SUMMARY

The present invention provides a system, method and software application for associating one or more phone numbers with an action on a phone and performing an action on the phone in response to the user initiating a call to one of such phone numbers. Certain phone numbers are associated with an action. The user's phone, or a server with which the user's phone communicates, maintains a table of the phone numbers associated with an action, and each phone number in the table is related to an action.

Software on the user's phone listens for call initiated by a user. When the user initiates a call, software on the phone "intercepts" the call before it is placed, and the phone (or a server with which the phone communicates) determines whether the call is to a phone number that is in the table. If the phone number is in the table, then it is associated with an action, and the user's phone performs that action at a time specified by instructions for such action. The action may be performed before, during, or after the call depending on the instructions associated with the call. Whether a call is placed to the original phone number depends on the action and the user's response to the action.

One example of the invention is that an action may be associated with a customer care phone number for a business (i.e., a customer service number). The action may be to display one or more self-service options when a user dials a phone number for customer care. Another example is that, when a user initiates a call to a certain phone number, the user may be given the option to download to the phone a software application. A further example is to provide the user with various call routing options when the user initiates a call to a particular phone number.

BRIEF DESCRIPTION OF THE DRAWINGS

FIGS. 2a-c illustrate example implementations of the present invention.

DETAILED DESCRIPTION OF THE PREFERRED EMBODIMENTS

Figure 1A:
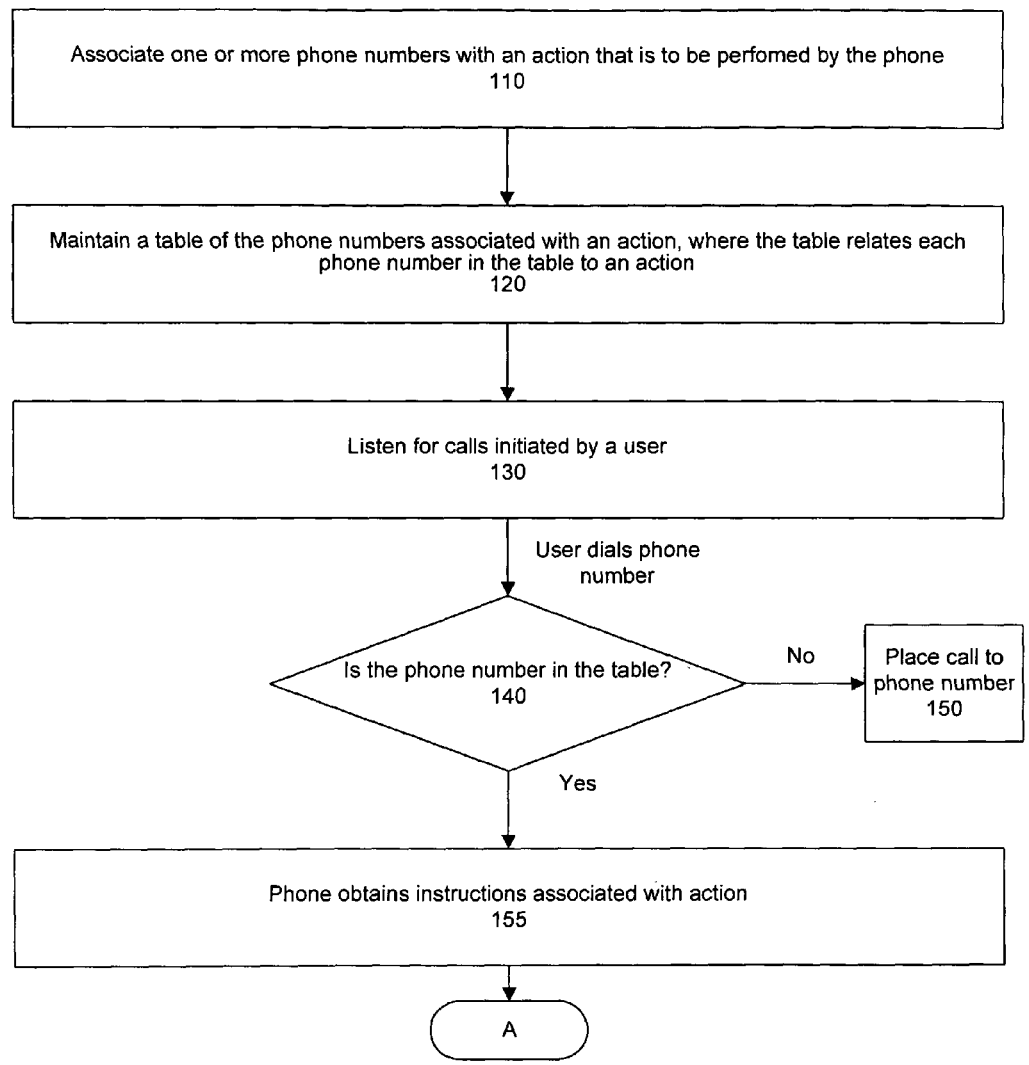
FIGS. 1a-b illustrate a flowchart that shows a method for associating one or more phone numbers with an action and performing an action in response to a user initiating a call to one of such phone numbers.
Figure 1B:
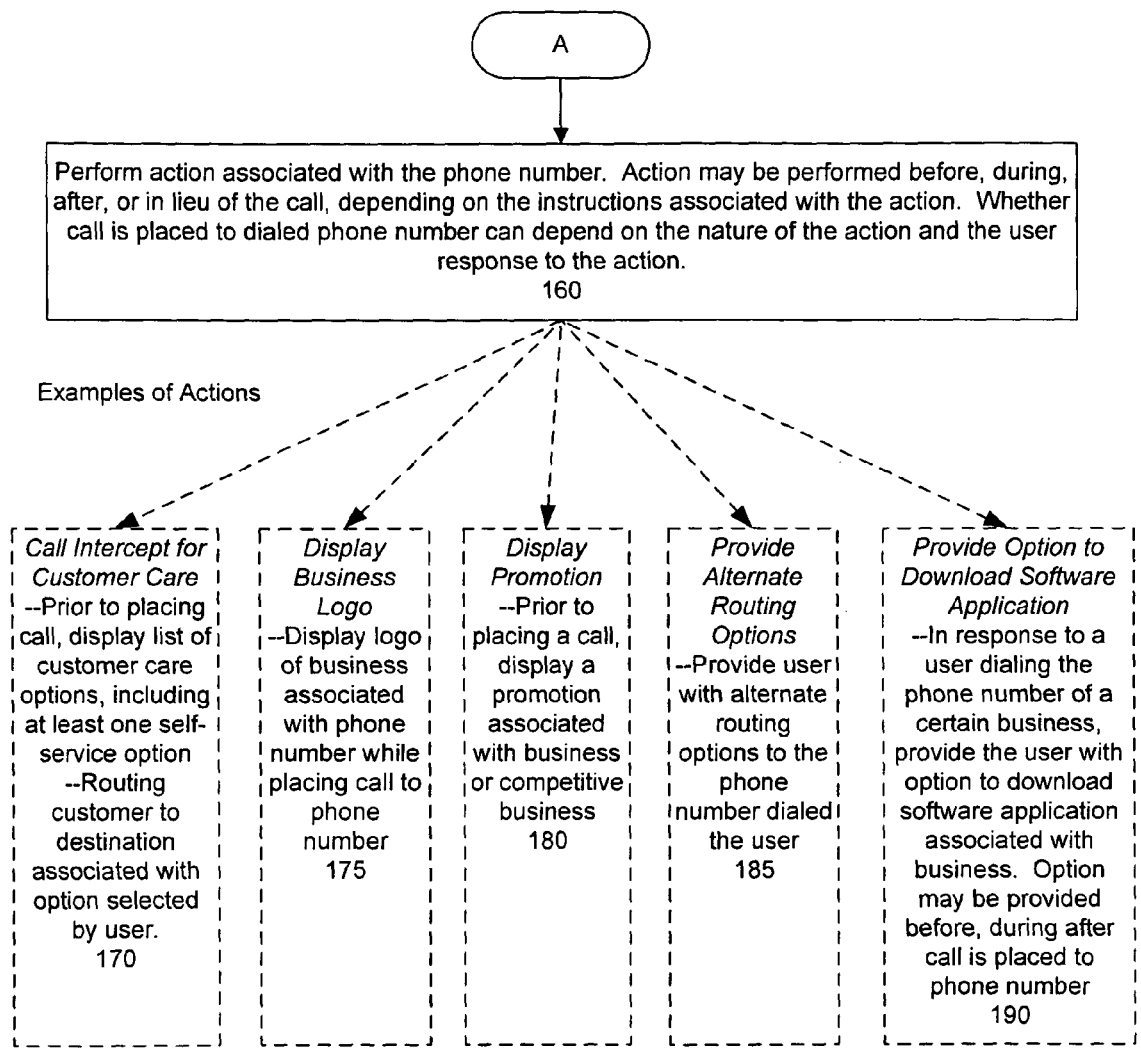

FIGS. 1a-b illustrate a method for performing an action on a user's phone in response to a user initiating a call on the phone. This method may be implemented on various different types of phones, including, but not limited to, wireless phones, digital phones, Voice over IP (VoIP) phones, and other types of phones capable of running a software application.

As shown in FIG. 1, the method involves associating one or more phone numbers with an action that can be performed by the phone (110). The phone, or a server with which the phone communicates, stores a table of the phone numbers that are associated with an action, where the table relates each phone number in the table to an action (120). The phone (specifically, software on the phone), then "listens" for phone calls initiated by the user (130). In response to a user initiating a call to a phone number, the phone, or a server with which the phone communicates, determines whether or not the phone number is in the table that lists phone numbers associated with actions (140). Such determination is made prior to placing the call. If it is not in the table, the phone proceeds with placing the call as normal (150).

If the phone number is in the table, the phone obtains the instructions associated with the action for the phone number (155), and performs the action at the time specified by the instructions (160). The action may be performed before, during, after placing the called to the phone number, depending on the instructions associated with the action. Also, the action may be performed in lieu of placing the call. Whether or not the call is eventually placed can depend on the nature of the action and the user's response to the action.

Each phone number may be associated with a different action, or multiple phone numbers can be associated with the same action. Also, there may be more than one action associated with a single phone number, and the action selected when the user dials the phone number can depend on information about the user, such as geographic information, the user's calling plan, or known user preferences.

Examples implementations of the invention include:

1. Call Intercept for Customer Care (170)

For cost reasons, most companies would prefer for the customer to resolve customer care issues using automated mechanisms instead of live agent time. One way in which this invention could be used is to associate the customer care phone number for a business with a display on the phone of automated customer care options. When a user initiates a call to the customer care center, the phone "intercepts" the call and displays a list of customer care options, which includes the original number dialed by the user and at least one self-service option. The user is then routed to the option selected by the user.

FIG. 2a illustrates an example of this implementation. The diagrams that accompany steps 210, 220, and 230 are example user interfaces on a user's phone associated with such steps. The user initiates a call to a customer care line, in this case "611" (210). Prior to placing the call, the phone displays a customer service page that includes several self-service options, including options to change the user's plan or services and to view and pay a bill (220). In this example, the user selects the "View/Pay Bill Option", and a summary of the bill and an automated bill pay option is displayed to the user (230). No call is placed (240), as the user's selection of the "View/Pay Bill" option is in lieu of placing a call to a live agent.

Figure 6:
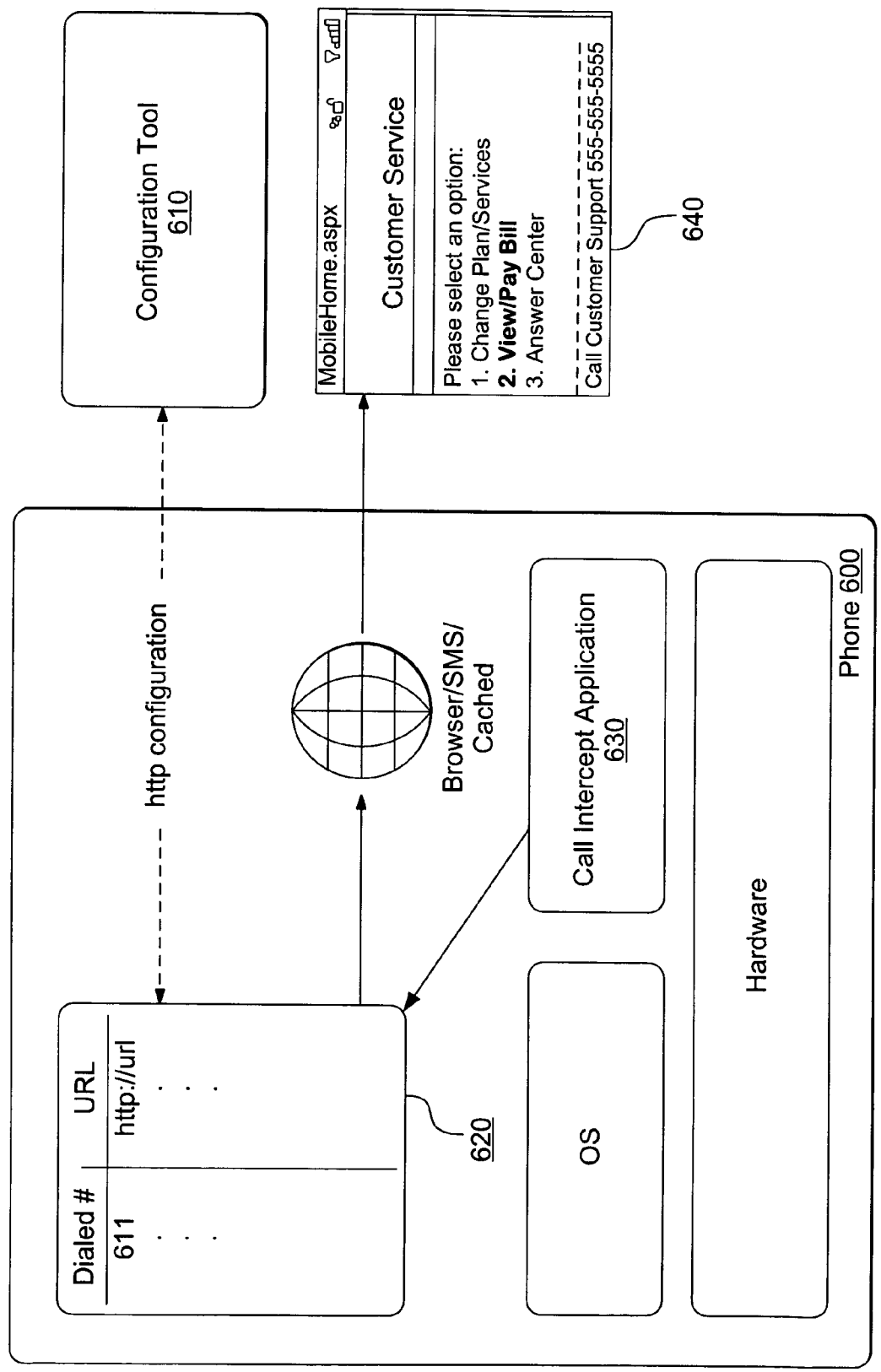
FIG. 6 is a block diagram of an architecture for an example of the invention.

FIG. 6 illustrates an example architecture for implementing call intercept for customer care. In this example, the customer care line is "611," which is a short-hand customer care number for a wireless communication provider. A system administrator uses a configuration tool 610 to associate the number "611" with the display of an interface 640 that provides a user with self-service customer care options. The configuration tool 610 downloads the association to a table 620 stored on the phone 600. When a user dials "611" or otherwise initiates a call to "611," a Call Intercept Application 630 (which is a software application that performs the method of FIGS. 1a-b), checks to see whether "611" is in the table 620. The Call Intercept Application 630 performs this look up prior to the phone making the call (i.e., it intercepts the call before the call is made). In response to finding "611" in the table 620, the Call Intercept Application 630 provides the URL of the interface associated with "611" to the phone's browser, and the interface 640 associated with such URL is retrieved and displayed in the browser. The interface 640 provides the user with several customer care options, including three self-service options (Change Plan/Services, View/Pay Bill, and Answer Center). The list of customer care options may be personalized to the user.

The interface 640 may be retrieved from a local cache on the phone, or from a remote server. The interface 640 may be a page on the World Wide Web or can be any page that is in format that can be displayed in a browser on the phone. In an alternate embodiment, customer care options are displayed in an SMS window or other text/graphics user interface.

Figure 4:
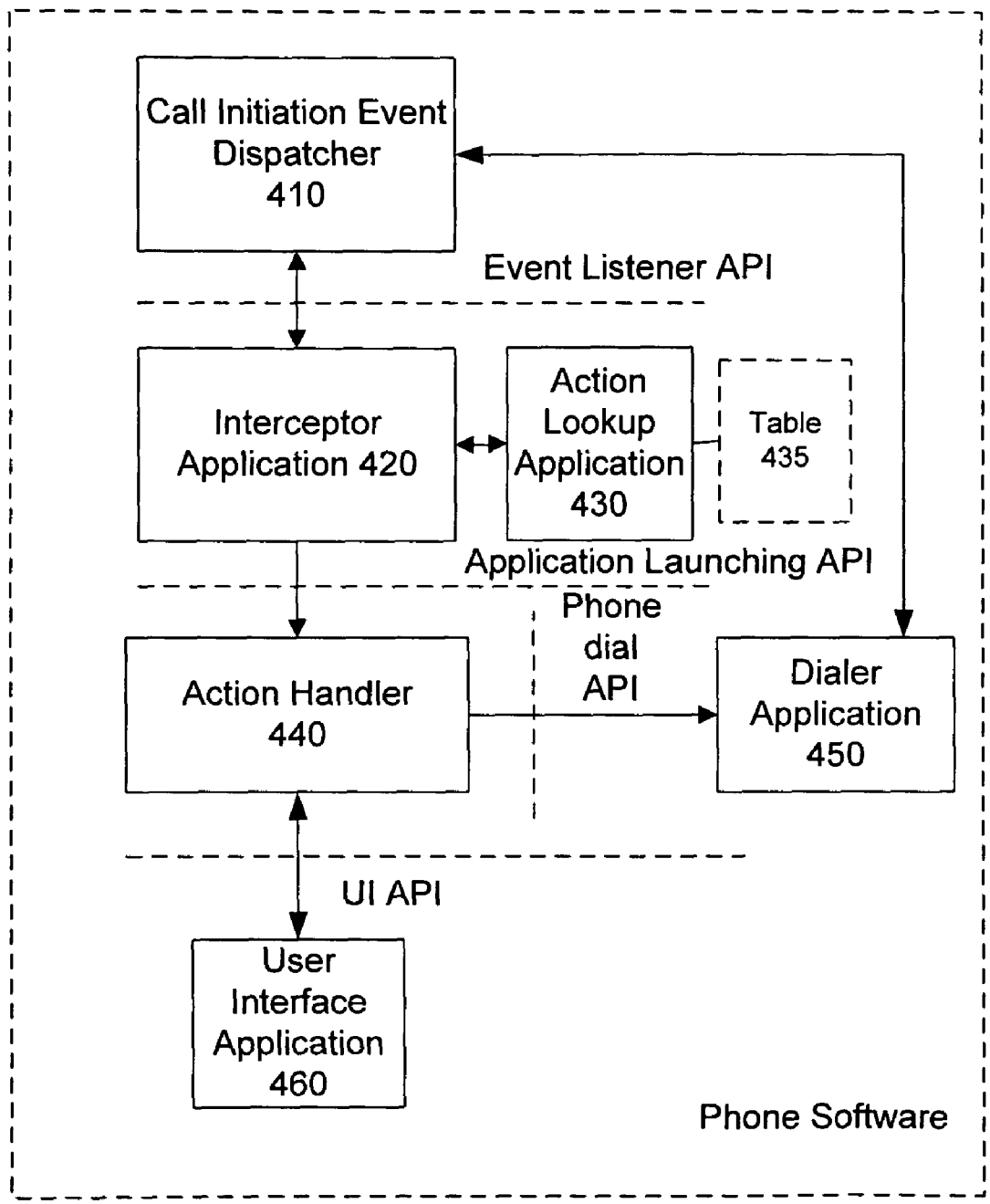
FIG. 4 is block diagram representation of software on a phone that can be used to implement one embodiment of the present invention.

In one embodiment, the Call Intercept Application 630 is implemented as the Call Intercept Application 420, Action Lookup Application 430, and Action Handler Application 440 described with respect to FIG. 4.

Figure 7:
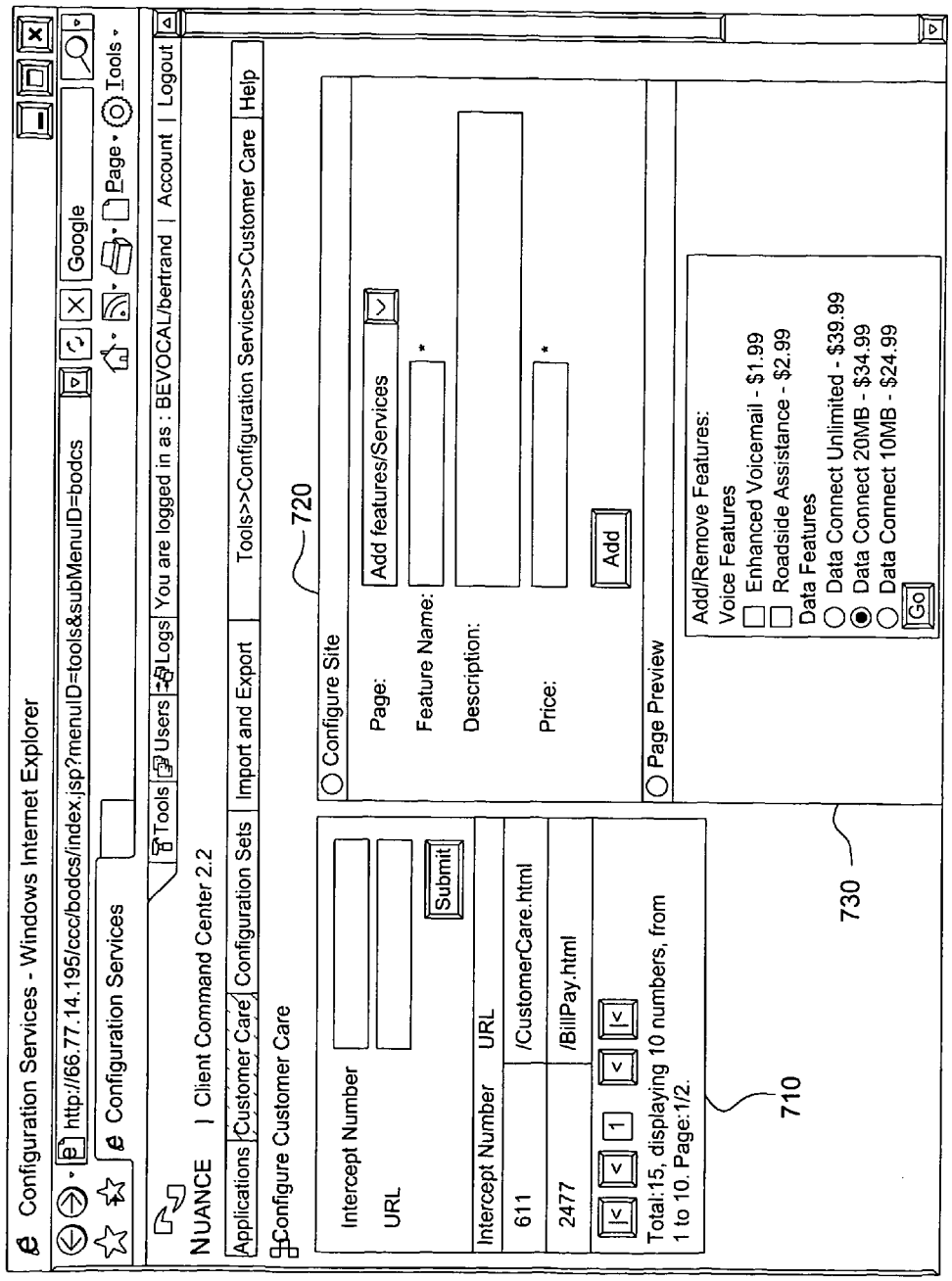
FIG. 7 is an example of the user interface for the configuration tool illustrated in FIG. 6.

The configuration tool 610 is a software application that communicates with users' phones to download content for table 620. Also, the configuration tool 610 can be used to configure the interface associated with select phone numbers. General configuration tools for downloading content and software code to phones are known in art. FIG. 7 illustrates an example of the user (e.g., system administrator) interface for configuration tool 610. A system administrator can associate a phone number with the display of an interface in window 710. In window 720, the system administrator can configure the content of the interface. Previews of interface pages are displayed in window 730, which in FIG. 7 illustrates a preview of an interface page through which a user can add or remove voice features in a wireless communication plan.

2. Display Business Logo (175)

Another example of the invention is to associate a business phone number with a business logo or trademark. An example of this is illustrated in FIG. 2b. A call is initiated to a business (250), the business's logo is displayed in the user interface of the phone while a call is placed to the business phone number (260), and the call continues as normal (270). In a further embodiment, information associated with the business can be displayed in addition to or in lieu of the logo/trademark.

3. Display Promotion (180)

Another example of the invention is to associate a phone number with a promotion. When a user dials a select phone number, a promotion is played to the user (or the user is offered the option to hear a promotion). The promotion may be associated with the entity called, a related entity, or a competing entity. This method is described in more detail in parent application Ser. No. 11/636,172, which is incorporated by reference herein (see "Related Applications" section).

4. Provide Alternate Routing Options (185)

Another example of the invention is to provide the user with a list of destination options when the user dials a particular phone number. This can help ensure that a user places a call to the correct destination. This method is described in more detail in parent application Ser. No. 11/529,078, which is incorporated by reference herein (see "Related Applications" section).

5. Provide Option to Download Software Application (190)

Figure 2C:
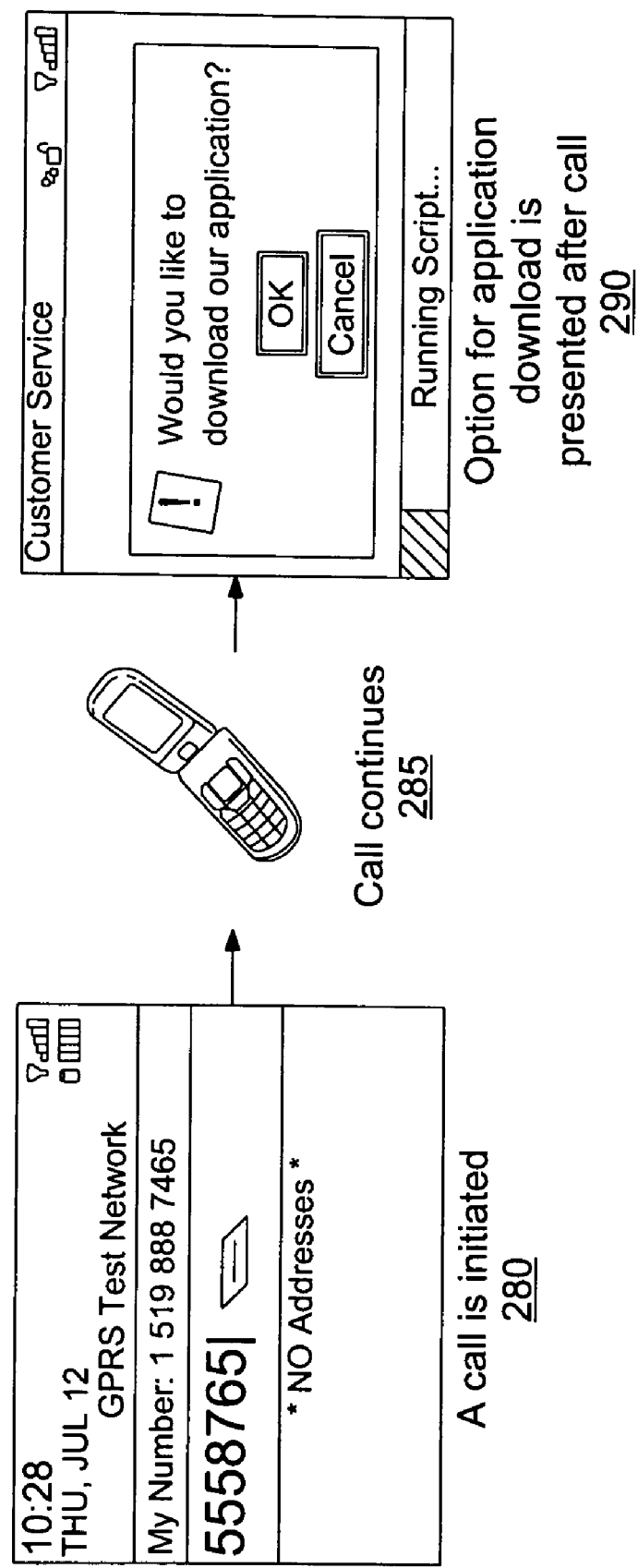

Another example of the invention is to associate a phone number with an option to download a software application to the phone. FIG. 2c illustrates an example of this implementation. A user initiates a call to a phone number that is associated with a software download option (280). The call continues as normal (285). After the call is completed, the user is provided with the option to download a software application (290). In alternate embodiments, the option may be presented (i) prior to placing the call, (ii) prior to and in lieu of continuing the call, or (iii) during the call.

The term "table" as used in this application need not be an exact table, but can be any structure which is able to make associations. The table that relates phone numbers to actions may stored locally on the user's phone, or remotely on a server. The table may store all information necessary for the phone to execute the action, or may reference a network address or a local cache on the phone where further instructions can be obtained. If the table is stored on the phone, then information for and updates to the table may be "pushed" to the phone or "pulled" by the phone. A remote server can send updates to the phone at the initiation of the remote server (a push) or at the request of the phone (a pull).

Figure 3:
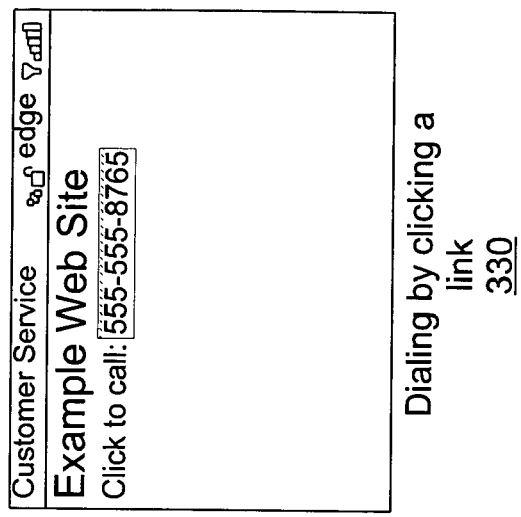
FIG. 3 are diagrams of user interfaces that illustrate example ways in which user can initiate a call.
Figure 3:
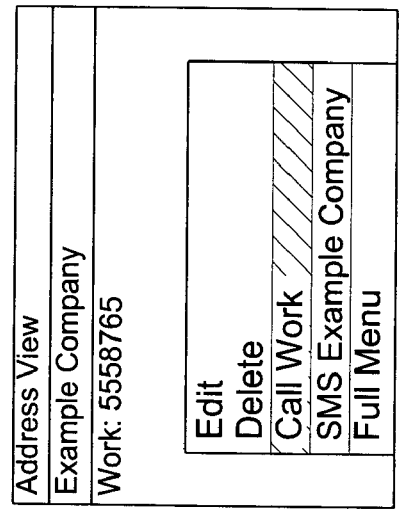
Figure 3:
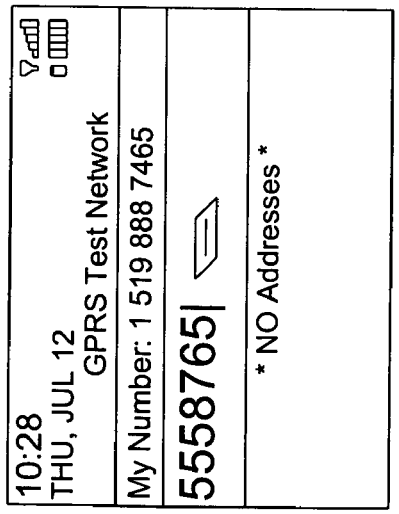

FIG. 3 illustrates example user interfaces on a phone that illustrate ways in which a user can initiate a call. The user can dial a phone number using the keyboard (see example user interface 310). The user can dial a phone number using a contact/address book, as shown in example user interface 320. The user also can dial a phone number by clicking a link, as shown in example user interface 330. A user also can initiate a call through voice-activated dialing. Those skilled in the art will appreciate that there may be other ways to initiate a call.

FIG. 4 illustrates an example of software on a digital phone that can be used to implement the present invention. For ease of explanation, such software can be thought of as divided into various functional modules. These modules are a Call Initiation Event Dispatcher 410, an Interceptor Application 420, an Action Lookup Application 430, an Action Handler Application 440, a Dialer Application 450, and a User Interface Application 460. Table 435 is a table located in memory on the phone. Table 435 stores the phone numbers associated with actions. It also stores instructions related to the actions associated with such phone numbers.

Those skilled in the art will appreciate that a phone will include additional functionality not represented by the above modules. However, such functionality is well known in the art and a discussion of such functionality is not relevant for an understanding of the invention described herein. Moreover, those skilled in the art will appreciate that there may be many ways to implement the present invention, and the software implementation described herein with respect to FIGS. 4-5 is just one example of an implementation.

Call-initiation event dispatchers (e.g., keystroke event dispatchers), user interface applications, and dialer applications are well known in the art. The Call Initiation Event Dispatcher 410 listens for call-initiation events (e.g., user dials phone number, double clicks on a phone number, uses voice-activated dialing) and provides such events to other applications on the phone that register for call-initiation events. The Interceptor Application 420 registers and receives call-initiation events. The Dialer Application 450 also registers for call-initiation events and dials phone numbers initiated by the user, unless such phone numbers are first consumed by the Interceptor Application 420. The User Interface Application 460 enables the display of information in the user interface on the phone.

The Interceptor Application 420 registers for call-initiation events as a higher priority application than the Dialer Application 450. The Interceptor Application 420 communicates with the Call Initiation Event Dispatcher 410 via an applicable event listener application programming interface (API). The operation of the other modules shown in FIG. 4 is described with respect to FIG. 5.

Figure 5A:
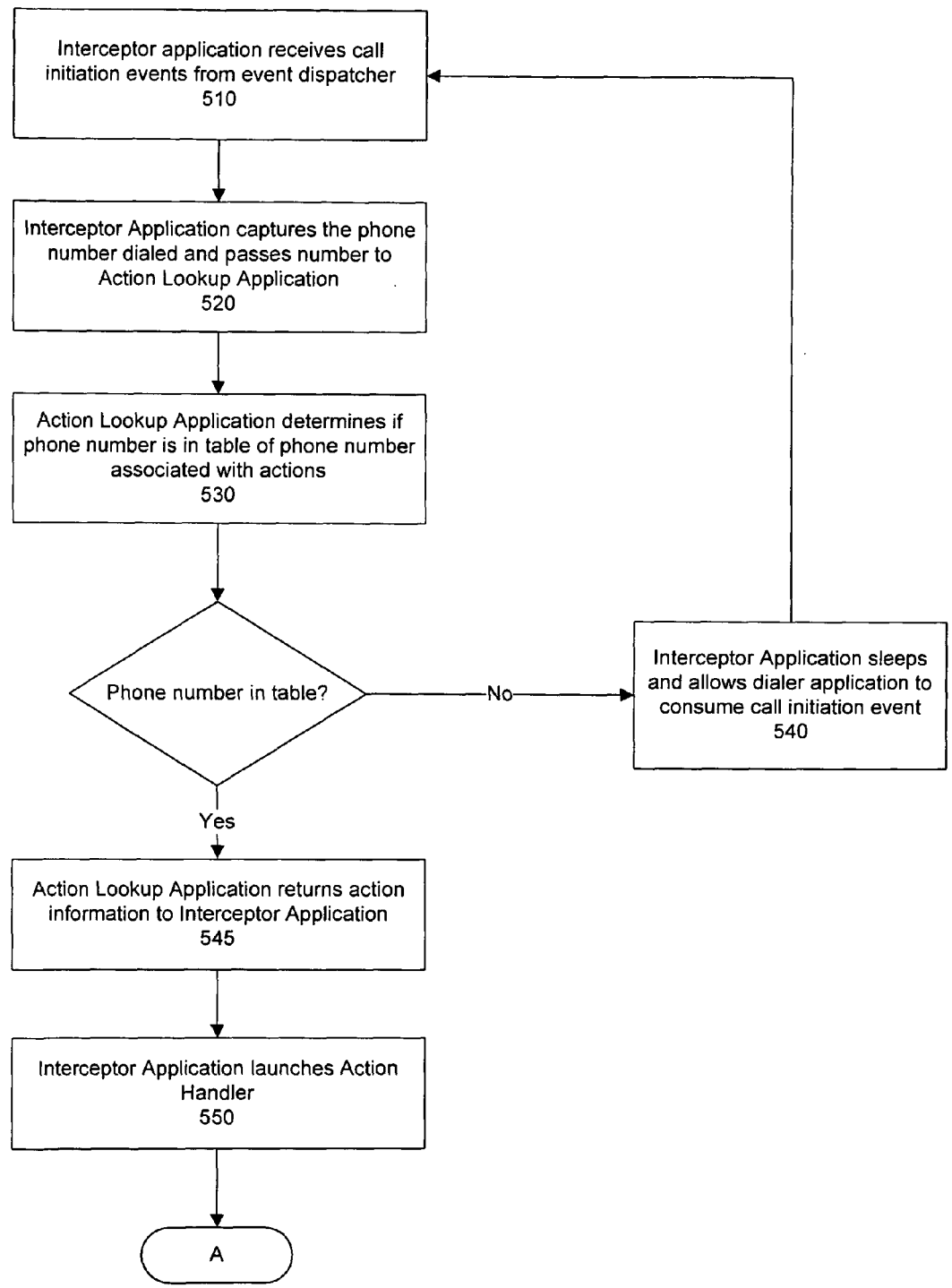
FIGS. 5a-b are flowcharts that illustrate operations of the Interceptor Application, Action Lookup Application, and Action Handler Application modules shown in FIG. 4.
Figure 5B:
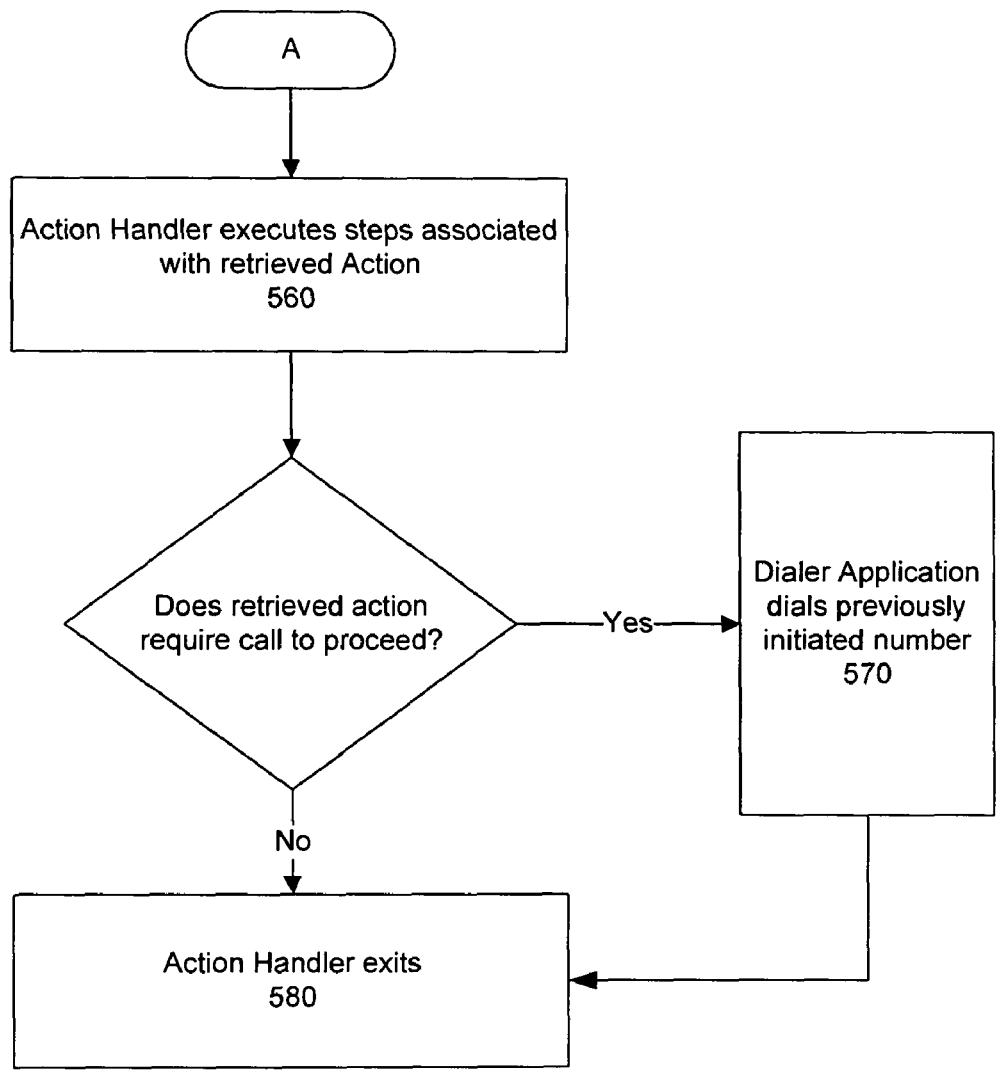

FIG. 5 illustrates one way in which the modules illustrated in FIG. 4 can operate to implement the method described with respect to FIGS. 1a-b. The Interceptor Application 420 receives call initiation events from the Call Initiation Event Dispatcher 410 (510). The Interceptor Application 420 captures the phone number dialed and passes the number to the Action Lookup Application 430 (520). The Action Lookup Application 430 determines whether or not the phone number is in table 435 (530). If, in an alternate embodiment, table 435 is stored on a remote server instead of locally on the phone, the Action Lookup Application communicates with the remote server to determine whether the phone number is in table 435.

If the phone number is not in table 435, the Interceptor Application 420 sleeps and allows the Dialer Application 450 to consume the phone number (540), where the Dialer Application 450 will then dial the phone number.

If the phone number is in table 435, the Action Lookup Application returns the action information to the Interceptor Application (545), and the Interceptor Application launches the Action Handler Application 440 (550). The Action Handler Application 440 executes steps associated with the retrieved action (560). If the retrieved action requires a call (either before, during, or after the action is fully executed), the Action Handler Application 440 passes the phone number to the Dialer Application 450, and the Dialer Application 450 dials the previously initiated action (570). Once execution of the action is complete, the Action Handler exits (580).

In one embodiment, the user can elect whether or not to have the Interceptor Application 420 activated on his/her phone. In such embodiment, the Call Intercept Application 420 intercepts calls to perform an action on the phone only if such feature is enabled by the user.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for performing an action on a phone in response to a user initiating a voice call, the method comprising:

associating each of one or more phone numbers with an action that is to be performed by the phone;

maintaining on the user's phone a table of the phone numbers associated with an action, wherein the table relates each phone number in the table to an action, wherein at least one phone number in the table is a phone number for a business, and wherein at least one action associated with the phone number for the business in the table is to provide the user with the option to download a software application associated with the business onto the phone, wherein the option is provided after continuing the call to the associated phone number and disconnecting the call from the associated phone number;

listening for calls initiated by a user on the phone;
in response to the user initiating a call, determining whether a phone number associated with the call is in the table, wherein such determination is made prior to placing the call; and
in response to the phone number being in the table, performing an action related to such phone number in the table.

2. The method of claim 1, wherein one phone number in the table is a phone number for customer care for a business, and an action associated with such phone number is to display on the phone a list of customer care options to the user prior to placing a call to the phone number.

3. The method of claim 2, wherein the list of customer care options includes at least one automated, self-service option.

4. The method of claim 3, wherein a self-service option includes an automated bill pay option.

5. The method of claim 3, wherein a self-service option includes viewing a web page for customer care for the business.

6. The method of claim 2, wherein the list of customer care options includes both an option to place a call to the phone number dialed by the user and at least one self-service option that is in lieu of placing a call to the phone number dialed by the user.

7. The method of claim 2, wherein the list of customer care options is personalized for the user of the phone.

8. The method of claim 1, wherein an action associated with such phone number is to display a logo associated with such business while placing the call to such phone number.

9. The method of claim 1, wherein an action associated with such phone number is to display information associated with such business while placing a call to such phone number.

10. The method of claim 1, wherein an action associated with a phone number in the table is to display an advertisement.

11. The method of claim 1, wherein an action associated with a phone number is to provide the user with additional routing options.

12. The method of claim 1, wherein the action may be performed prior to placing the call, during the call, or after the call, depending on instructions associated with such action.

13. The method of claim 1, wherein the action may be performed in lieu of placing the call, depending on the action and the user's response to the action.

14. The method of claim 1, wherein, for an action associated with a phone number, the table specifies a network address at which further instructions for the action can be obtained by the phone.

15. The method of claim 1, wherein, for an action associated with a phone number, the table specifies a location in a local cache on the phone where further instructions for the action can be obtained by the phone.

16. The method of claim 1, wherein a remote server updates the table by downloading updates to the phone.

17. The method of claim 1, wherein the phone periodically polls a remote server for updates to the table, and if the remote server has updates, the remote server downloads the updates to the phone.

18. The method of claim 1, wherein a plurality of phone numbers in the table can be associated with the same action.

19. The method of claim 1, wherein each phone number in the table can be associated with a different action.

20. The method of claim 1, wherein a phone number in the table can be associated with a plurality of actions.

21. The method of claim 20, wherein, when a user initiates a call to a phone number associated with a plurality of actions, the action performed in response to the user initiating such call is based on information about the user.

22. A method for performing an action on a phone in response to a user initiating a voice call, the method comprising:
associating on the user's phone each of one or more phone numbers with an action, wherein at least one phone number is a phone number for a business and wherein at least one action associated with the phone number for the business is to provide the user with the option to download a software application associated with the business onto the phone, wherein the option is provided after continuing the call to the associated phone number and disconnecting the call from the associated phone number;
listening for phone numbers dialed by a user on the phone;
in response to the user initiating a call to a phone number, determining whether the phone number is one of the phone numbers associated with an action, wherein such determination is made prior to placing the call; and
in response to the phone number being one of the phone numbers associated with an action, performing an action related to such phone number.

23. A non-transitory processor-readable medium having processor-executable instructions for performing a method comprising:
associating each of one or more phone numbers with an action that is to be performed by a phone;
maintaining on the user's phone a table of the phone numbers associated with an action, wherein the table relates each phone number in the table to an action, wherein at least one phone number in the table is a phone number for a business, and wherein at least one action associated with the phone number for the business in the table is to provide the user with the option to download a software application associated with the business onto the phone, wherein the option is provided after continuing the call to the associated phone number and disconnecting the call from the associated phone number;
listening for voice calls initiated by a user on the phone;
in response to the user initiating a call, determining whether a phone number associated with the call is in the table, wherein such determination is made prior to placing the call; and
in response to the phone number being in the table, performing an action related to such phone number in the table.

* * * * *